UNITED STATES PATENT OFFICE.

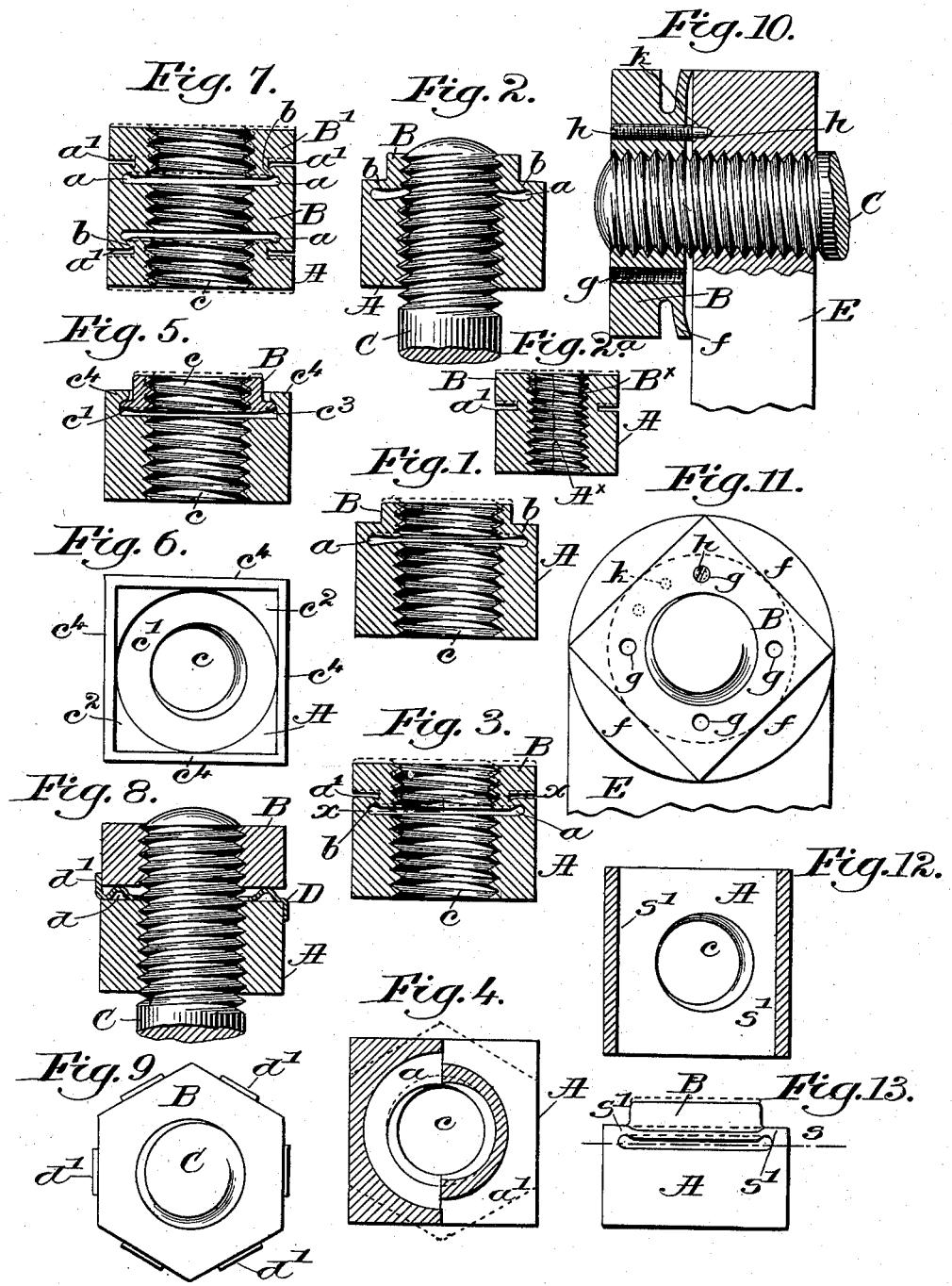

EDGAR ALFRED GODDIN, OF LONDON, ENGLAND.

LOCK-NUT.

SPECIFICATION forming part of Letters Patent No. 609,144, dated August 16, 1898.

Application filed March 1, 1897. Serial No. 625,450. (No model.) Patented in England January 27, 1896, No. 1,930.

*To all whom it may concern:*

Be it known that I, EDGAR ALFRED GODDIN, a subject of the Queen of England, residing at London, England, have invented a new and useful Lock-Nut, (for which I have obtained a patent in Great Britain, No. 1,930, bearing date January 27, 1896,) of which the following is a specification.

This invention relates to improvements in lock-nuts or means of preventing the unscrewing of threaded parts and the like, and has for its object the providing of a nut or other equivalent part which will resist the various forces tending to unscrew it when in use.

This result I obtain by providing the nut with two or more threaded portions or zones of considerable depth and each of the same pitch as the bolt, stud, or other threaded part to which it is to be applied, these said threaded portions or zones being so disposed with relation to each other along the bore of the nut as to be out of pitch—that is to say, if the threads of any two adjacent portions were produced so as to encroach upon each other they would not coincide. The thread or threads may be continuous or may be interrupted by an annular groove at that part or parts of the nut which separate the said uniformly-threaded portions or zones. Such a nut may be easily screwed onto a bolt, stud, or other threaded part until its second threaded portion or zone is reached, when the said nut must be stretched or compressed before it will go farther, after which the friction between the said bolt or other threaded part and the nut will be so great as to resist any tendency to unscrew.

The following is one way in which I apply my invention, but I do not restrict myself to any specific construction: I provide the nut with one or more internal or external annular grooves, or I may provide it with both internal and external annular grooves, and after threading the said nut in the usual way I compress or stretch it at that part or parts where its cross-sectional area has been reduced by the said annular groove or grooves, or I may dispense with the said compressing or stretching operation by threading the different portions separately.

In a modified construction I use two or more nuts coöperating with one or more suitable elastic connections which urge the said nuts when in use together or apart, so as to increase the friction between the bolt or other threaded part and the nuts, so as to effect their jamming or locking. This elastic connection is provided with ears, projections, or other suitable means of preventing the relative movement of the nuts with which it coöperates.

I may, however, dispense with a separate elastic connection and prevent the relative movement of the nuts by means of one or more pins or their equivalents coöperating with suitably-located holes, grooves, or the like.

My invention obviously applies to any screwed hole irrespective of the form of the part containing it or to which it is applied.

Figures 1, 2$^a$, 3, 5, and 7 are respectively central vertical sections of various forms of my invention. Figs. 2, 8, and 10 are similar views showing my improved nut in different modifications thereof as applied in operative position to a bolt or threaded end. Fig. 4 is an irregular horizontal section taken on the line $x\,x$, Fig. 3. Fig. 6 is a plan view of the lower part A of the nut shown in Fig. 5 before the part B has been secured therein. Figs. 9 and 11 are top plan views of the forms of lock-nuts shown, respectively, in Figs. 8 and 10. Figs. 12 and 13 are respectively a transverse horizontal section and side elevation of another embodiment of my invention.

In Figs. 1 and 2 the nut A has a boss B and is provided with an annular recess $a$, so as to form a web $b$, which when subjected to pressure enables the two uniformly-threaded portions A and B to be brought slightly nearer to each other, with the result that when the nut is screwed onto a threaded part C the said two parts A and B must be forced apart to a greater or less extent before the threaded part C can enter the second part B of the nut.

Owing to the stretching and consequent dishing of the annular web $b$ when the parts A and B are squeezed together and to the elasticity of the metal of which the nut is made the said web $b$ acts as a spring and in pulling the parts A and B toward each other puts a heavy, but yielding, pressure upon the entire thread of the part C inclosed by the nut. This pressure, however, is taken by the top side of the thread of the part C that lies within B and by the bottom side of the thread of the part C that lies within A. Consequently any pressure tending to force the nut off the bolt or other screwed part C will increase its resistance to turn.

In Fig. 2 the nut is shown applied to a slack bolt and shows a space above the tops of the bolt-thread in the lower part A of the nut, but not in the upper part B. This is owing to the fact that when the bolt C begins to enter B the pressure is taken by a very small portion of the thread of that part of the nut, which is consequently slightly bent upward, and so decreases the space between it and the next convolution of the thread, with the result that the thread of the bolt has to wedge its way between the threads of the upper section B of the nut. This minute distortion, which gradually decreases as the bearing area of the threads in B increases, is rectified by the wedging action of the bolt C, which restores the distorted portions to their proper condition as it gets farther into the said section B of the nut and at the same time causes the web $b$ to yield instead.

In Fig. $2^a$ the nut A is shown with an external annular groove $a'$, and the thread or threads of the uniformly-threaded zones or portions $A^\times$ $B^\times$ are continuous, while that part of the said thread or threads which lies between them and is in the plane of reduced cross-sectional area has its pitch reduced when the two parts A and B are squeezed together.

In Figs. 3 and 4 the web $b$ is formed by providing the nut with an internal annular groove $a$ and an external annular groove $a'$.

In Figs. 5 and 6 the nut is composed of two parts A and B. The part A is screw-threaded at $c$ and is provided with an enlarged circular opening $c'$, which leads into another opening $c^2$ at the top of this part, while the part B consists of a boss, also screw-threaded at $c$, and an irregular-shaped flange $c^3$, adapted to lie in the opening $c^2$, where it is secured by its walls $c^4$, which are burred over after it is in place.

Fig. 7 differs from Figs. 3 and 4 in that it is provided with three uniformly-threaded sections or zones A, B, and B' instead of two and that these parts are elastically united to each other by two webs $b$, formed by two internal and two external annular grooves $a$ and $a'$, respectively, instead of one of each, as in said Figs. 3 and 4.

Figs. 8 and 9 illustrate an arrangement consisting of two nuts A and B, having a compressible washer D between them, which admits of such relative adjustment of the nuts as will enable subsequent relative movement to be prevented, such as by pinning, bending of ears, or other equivalent means. This arrangement also enables the degree of locking to be adjusted.

The compressible washer D, which is made of a suitable elastic material, is provided with one or more annular or other suitable corrugations $d$ and has ears $d'$, adapted to be bent up and down alternately, so as to prevent the relative movements of the nuts after their adjustment.

In Figs. 10 and 11 is shown another arrangement, in which the nut B is provided with a yielding or elastic flange $f$.

In use the nut B is screwed onto the threaded part C and the flange $f$ compressed until one of the holes $g$ in the nut B is opposite one of the holes $k$ in the other nut or adjacent part E, when a pin or screw is inserted to prevent further relative movement.

Figs. 12 and 13 show a modified form of lock-nut which differs from Figs. 1 and 2 in that it is provided with a slit $s$, going right through the nut from side to side, instead of an internal annular recess, as in said Figs. 1 and 2, the two parts A and B of the nut being united by the parts $s'$.

I am aware that before my invention a large number of lock-nuts have been proposed, these different inventions including the idea of providing an internal annular groove close to the end of the nut which bears against the surface being secured, said surface being beveled, so as to provide a thin edge between said groove and surface to be forced inwardly as the nut is screwed tightly in place, also including the idea of providing a nut of the general form last mentioned, but having the said thin edge permanently bent inwardly, so as to bring the fragmentary threads thereof out of pitch with the threads of the bolt proper; but both of these nuts are radically different from my invention in that the effect is simply to distort the threads of the thin edge portions or force them along as the nut is screwed tight until they are substantially restored to their original position, thereby merely producing a bad nut, whereas by my invention the thread area of the section B of the nut is given sufficient depth and provided with a plurality of convolutions of thread, so that the resistance of the threads to the distorting tendency is greater than the resistance of the spring portion or web of the nut to yield, and therefore the latter yields and brings its spring action to bear on the threaded zones or sections of the nut instead of compelling the threads to become permanently broken down and injured, as in the two previously-proposed devices mentioned. I am also aware that several devices have been proposed in which two separate nuts or separate portions similarly threaded have been constructed capable of relative rotation, so that when the nut has been screwed tightly in place a further turn of the outer portion thereof would lock the two in position after the manner of the usual check-nut, a further modification of this idea being the provision of a dish-shaped or concaved washer between the two independent portions of the nut, so that when the outer portion had been screwed with sufficient force against said washer it would be flattened out and wedged in place between the two portions of the nut. All of these previous constructions, however, are radically different from my invention in having no spring portions to normally hold the sections thereof out of pitch with each other. The different sections or zones of my improved nut are relatively non-rotatable and are also held either away from each other or toward each other by a positive spring action when they are in place on a bolt.

In the British Patent No. 2,771 of 1888 is shown a nut having saw-cuts through its walls extending half-way or more through from one side of the nut or cut in a helical form and then distorted by being deflected or pulled out, so that when the nut might be turned onto a bolt one side would wedge relatively to the other. This is, however, entirely different from my invention, not only in construction, but also in principle. By the construction of my invention the two or more zones are invariably held parallel to each other, and one side can never wedge relatively to the opposite side, as there is always at all diametrically opposite sides the same uniform elasticity or tendency to direct longitudinal movement, and also by giving the zone or section B a considerable depth of threaded surface the minute distortion which takes place at the forward end or portion of the thread as the nut enters upon its bolt in being turned into place is caused to gradually decrease as the bearing area of the threads in the section B increases, so that this minute distortion is entirely rectified by the wedging action of the bolt C upon the extended threaded area of B, the bolt restoring the said slightly-distorted portions to their proper condition as it gets farther into the section B of the nut, at the same time causing the spring web or portion $b$ to yield instead.

Having now particularly described and ascertained the nature of my said invention and in what manner the same is to be performed, I declare that what I claim is—

1. A lock-nut, or other equivalent part or parts, having two or more uniformly-threaded sections or zones, and provided with one or more elastic or spring portions between them uniform in extent or elasticity on all sides of the nut, and thereby exerting uniform action on all sides of the nut-axis, each section having considerable relative depth and being provided with threads having a plurality of complete turns therein, said sections being non-rotatable relatively to each other and being normally held out of pitch but still parallel with each other by said spring portions, substantially as described.

2. A lock-nut, or other equivalent part or parts having two or more uniformly-threaded sections or zones and provided with one or more elastic or spring portions between them exerting uniform action on all sides of the nut-axis, said sections on their inner or threaded edges being separated by an annular space transverse to, uniform at all sides about, and diametrically opposite, the nut-axis, each section having considerable relative depth and being provided with threads having a plurality of complete turns therein, said sections being non-rotatable relatively to each other and being normally held out of pitch and parallel with each other by said spring portions, substantially as described.

3. A lock-nut, or other equivalent part or parts, having two or more uniformly-threaded sections or zones and provided with one or more elastic or spring portions between them exerting uniform action on all sides of the nut-axis, said sections on their inner or threaded edges being separated by an annular space transverse to the nut-axis, and on their outer edges or walls being separated by a peripheral slit extending uniformly and only partially through to the inner threaded portion of the nut, each section having considerable relative depth and being provided with threads having a plurality of complete turns therein, said sections being non-rotatable relatively to each other, and being normally held out of pitch with each other by said spring portions, substantially as described.

4. A lock-nut, comprising two or more uniformly-threaded sections or zones, and provided with one or more elastic or spring portions between them exerting uniform action on all sides of the nut-axis, said sections on their outer edges or walls being separated by a peripheral slit extending uniformly and only partially through to the inner threaded portion of the nut, each section having considerable relative depth and being provided with threads having a plurality of complete turns therein, said sections being non-rotatable relatively to each other, and being normally held out of pitch with each other by said spring portion, substantially as described.

In witness whereof I have signed this specification in presence of two witnesses.

EDGAR ALFRED GODDIN.

Witnesses:
H. W. GODDIN,
T. H. BOUCHER.